United States Patent [19]
Bohn

[11] Patent Number: 6,097,507
[45] Date of Patent: Aug. 1, 2000

[54] PORTABLE SCANNER WITH PIVOTING IMAGE HEAD AND ROTATING MIRROR

[75] Inventor: David D. Bohn, Fort Collins, Colo.

[73] Assignee: Hewlett-Packard Company, Palo Alto, Calif.

[21] Appl. No.: 09/056,429

[22] Filed: Apr. 7, 1998

[51] Int. Cl.$^7$ .................................................. H04N 1/024
[52] U.S. Cl. ......................................... 358/473; 382/313
[58] Field of Search ................... 358/473, 474, 358/475; 382/313–317

[56] References Cited

U.S. PATENT DOCUMENTS

| | | | |
|---|---|---|---|
| 3,918,028 | 11/1975 | Humphrey et al. | 382/313 |
| 4,251,798 | 2/1981 | Swartz et al. | 250/568 |
| 4,611,246 | 9/1986 | Nihei | 358/256 |
| 4,626,925 | 12/1986 | Toyoda | 358/285 |
| 4,851,921 | 7/1989 | Sato et al. | 358/474 |
| 4,868,676 | 9/1989 | Matsuura et al. | 358/474 |
| 4,899,228 | 2/1990 | Sano et al. | 358/473 |
| 5,115,227 | 5/1992 | Keiji | 340/709 |
| 5,218,462 | 6/1993 | Kitamura et al. | 358/473 |
| 5,227,909 | 7/1993 | Watson | 358/473 |
| 5,552,597 | 9/1996 | McConica | 250/234 |
| 5,734,477 | 3/1998 | Tsai | 358/474 |
| 5,852,686 | 12/1998 | Kubo et al. | 382/313 |
| 5,903,364 | 5/1999 | Shih-Min | 358/498 |
| 5,923,444 | 7/1999 | Bohn | 358/473 |
| 5,940,546 | 8/1999 | Howard | 382/313 |
| 5,991,054 | 11/1999 | Hung et al. | 358/474 |

FOREIGN PATENT DOCUMENTS

63-292760  11/1988  Japan  ...............  H04N 1/04

*Primary Examiner*—Jerome Grant, II
*Attorney, Agent, or Firm*—Cynthia S. Mitchell

[57] ABSTRACT

A hand-held scanner apparatus may comprise a body and an image head mounted for rotational movement to the body. The rotation of the rotating image head maintains the face of the image head in contact with the document during a scanning operation even though the user may rock or tilt the body of the hand-held scanner during the scanning operation.

9 Claims, 7 Drawing Sheets

PORTABLE SCANNER WITH PIVOTING IMAGE HEAD AND ROTATING MIRROR

FIELD OF INVENTION

This invention relates to imaging devices in general and more specifically to hand-held or portable optical scanners.

BACKGROUND

Imaging devices, such as optical scanners, are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A typical optical scanner includes illumination and optical systems to illuminate the object and to focus a small area of the illuminated object, usually referred to as a "scan line," onto the surface of a photosensitive detector positioned within the scanner. Image data representative of the entire object may then be obtained by sweeping the illuminated scan line across the entire object, either by moving the object with respect to the illumination and optical assemblies or by moving the illumination and optical assemblies relative to the object. The illumination system may include a suitable white light source (e.g., a fluorescent or incandescent lamp or an array of light emitting diodes (LEDs)) to illuminate the object, whereas the optical system may include a lens assembly to focus the image of the illuminated scan line onto the surface of the detector.

The photosensitive detector array used to detect the image light focused thereon is typically a charge-coupled device (CCD), although other devices may also be used. A typical CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals, known as sampling intervals, which may be about 5 milliseconds or so for a typical scanner, although other sampling intervals may be used.

The term "image light" as used herein refers to the light that is focused onto the surface of the detector array by the lens assembly. Depending on the type of scanner and the type of document, the image light may be reflected from the document or object being scanned or it may be transmitted through the object or document. The image light is converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals may then be processed and/or stored as desired.

A hand-held or portable optical scanner is an optical scanner which is designed to be moved by hand across a scanned object, e.g., a page of text or a drawing or photograph. Such hand-held or portable optical scanners are well-known in the art and various components thereof are disclosed in U.S. Pat. No. 5,552,597 of McConica, and U.S. Pat. No. 5,586,212 of McConica, et al, which are hereby incorporated by reference for all that they disclose.

One problem associated with many hand-held scanners relates to the ability to maintain the appropriate positional relationship between the illumination optical system and image optical systems and the object being scanned. Generally speaking, it is desirable to maintain the optical system at right angles to the surface of the object, although other angles may be used depending on the particular design of the scanner. In any event, if the illumination optical system and, particularly, the image optical systems, are not maintained at the proper orientation, the result can be an out of focus image on the detector with a commensurate decrease in scanned image quality. In cases of extreme positional deviation, the resulting image data may be useless. If the hand-held scanner includes a position sensing system such positional deviations may compromise the effectiveness of that system as well.

To illustrate the foregoing problems, a hand-held scanner having a position sensing system may be capable of relatively high scanning speeds (e.g., 18 inches/sec). At such high scanning speeds it is difficult for the user to maintain the proper scanner orientation, particularly when changing scan directions, such as is required at the edge of the document.

The foregoing positional deviation issue does not present a serious problem in desktop and/or flat-bed scanners since the mechanical arrangement of the scanners usually precludes any significant positional deviations between the optical system and the object being scanned. However, the same is not true for many hand-held scanners. That is, since a hand-held scanner is moved by hand across the object being scanned, there is a significant likelihood that the user will induce significant positional deviations by rocking and/or tilting the scanner while sweeping it over the object. While skillful users may be able to sweep the hand-held scanner over the object without significant positional deviations, the scanning process can be considerably more difficult and frustrating for less-skilled and/or novice hand-held scanner users.

Therefore, a need exists for a hand-held scanner that will allow a user to more easily maintain the proper positional relationship between the scanner optics and the object being scanned in order to more consistently produce high-quality scanned image data.

One solution to maintain a constant optical path length is a Floating Image Head Design, such as that disclosed in U.S. Pat. No. 5,923,444 of Bohn, which is incorporated herein for all that it teaches. The disadvantage of the Floating Image Head Design is that all of the optics are contained in the rotating image head that requires the use of a SELFOC type lens, which has a poor field depth and poor color imaging and is quite expensive. It would be advantageous to have a hand-held scanner that maintains a constant optical path length without the required use of an expensive SELFOC type lens.

SUMMARY OF THE INVENTION

A hand-held scanner apparatus may comprise a body and an image head mounted for rotational movement to the body. A rotating mirror maintains a constant optical path length and also maintains the optical path perpendicular to the document being scanned. The rotating mirror maintains a constant optical path length, while permitting some of the optical elements to be in the scanner body, rather than in the image head. The rotating mirror also permits the use of a lens reduction system rather than a SELFOC type lens system. The use of the lens reduction system over the SELFOC type lens permits a greater depth of field, better color imaging, lower lens costs, and lower image sensor costs.

Also disclosed is a method for scanning an object. The first step in the method is to provide a hand-held scanner apparatus having a body, and an image head mounted for rotational movement in relation to the body. Next, the hand-held scanner apparatus is positioned on the object so that the face of the image head is in contact with the object. The hand-held scanner is then swept over the object so that the face of the image head remains substantially in contact with the object during the sweeping step. As the image head mounted for rotational movement pivots in relation to the body, the rotating mirror rotates in a predetermined ratio to the rotation of the image head.

BRIEF DESCRIPTION OF THE DRAWING

Illustrative and presently preferred embodiments of the invention are shown in the accompanying drawings in which.

DETAILED DESCRIPTION OF THE INVENTION

One embodiment of a hand-held scanner apparatus 10 having a rotating image head 12 is shown in FIGS. 1–4. Essentially, the hand-held scanner apparatus 10 includes a body 14 to which is mounted for rotational movement an image head 12.

The body 14 of hand-held scanner apparatus 10 may include the various electronic components and systems required for the operation of the hand-held scanner apparatus 10. For example, the body 14 may include a microprocessor and associated random access memory (RAM), read only memory (ROM), and mass data storage device, as well as any other devices and/or circuitry (not shown) that may be necessary or desirable to include in such a handheld scanner apparatus 10. The body 14 may also include a display 26, such as a liquid crystal display, for displaying data relating to the function and operation of the scanner 10. A plurality of function buttons 28 and a stop/start bar 30 may also be incorporated into the body 14 to control the various functions of the hand-held scanner 10 and to initiate and terminate scanning of the document 24. The body portion 14 of scanner 10 may also include an electrical power source, such as a battery (not shown), suitable for supplying the scanner 10 with electrical power.

The rotating image head 12 may be a "contact" type of image head wherein the face 32 of image head 12 is designed to remain in contact with the object 24 during the scanning (i.e., sweeping) operation. The face 32 of image head 12 should remain in contact with the object 24 (i.e., not tilted with respect thereto) to ensure peak imaging performance.

In order to scan the object 24 (e.g., a piece of paper with printed text 25 thereon), the user (not shown) first positions the scanner apparatus 10 so that the face 32 of the image head 12 is positioned flat against the surface of the paper 24. See FIG. 4. Then, after making the appropriate selections with the function buttons 28, the user initiates the scanning process by pressing the start/stop bar 30 and by sweeping the scanner 10 across the page in the scan direction, as indicated by arrow 27. Since the scanner 10 is hand-held, it is likely that the user will be unable to hold the body 14 completely square with regard to the paper 24 during the sweep operation, e.g., the user may rock or tilt the body 14 to some degree during the sweep operation, as indicated by arrows 31 in FIG. 4. However, since the image head 12 is mounted for rotational movement with respect to the body 14, which helps to maintain contact between the image head 12 and paper 24 so that the face 32 remains firmly flat thereon.

A significant advantage of the present invention is that the rotating image head 12 may remain flat against the surface of the object 24 being scanned even though the user may be slightly tilting or rocking the body 14 of the scanner 10 during the sweep operation. Accordingly, it is considerably easier to obtain a high quality scanned image from the hand-held scanner and with less concentration on the part of the user than would otherwise be possible. Another advantage of the rotating image head 12 is that the effective pivot center of the rotating image head 12 is located close to, or even on, the surface of the object 24 which minimizes the tendency for the rotating image head 12 to "trip" or "knuckle over" as the user guides the scanner 10 over the object 24.

Having briefly described the overall desirability and function of the rotating hand-held scanner apparatus 10, as well as some of its more significant features and advantages, the specific details of the rotating hand-held scanner according to the present invention will now be described in detail.

Since hand-held scanners are generally well-known in the art and since the details of the various electrical components and systems that may be necessary or desirable in such a hand-held scanner are not necessary for the understanding of the present invention, the various electronic devices and systems contained within the body 14 will not be described in further detail.

Figure 5:
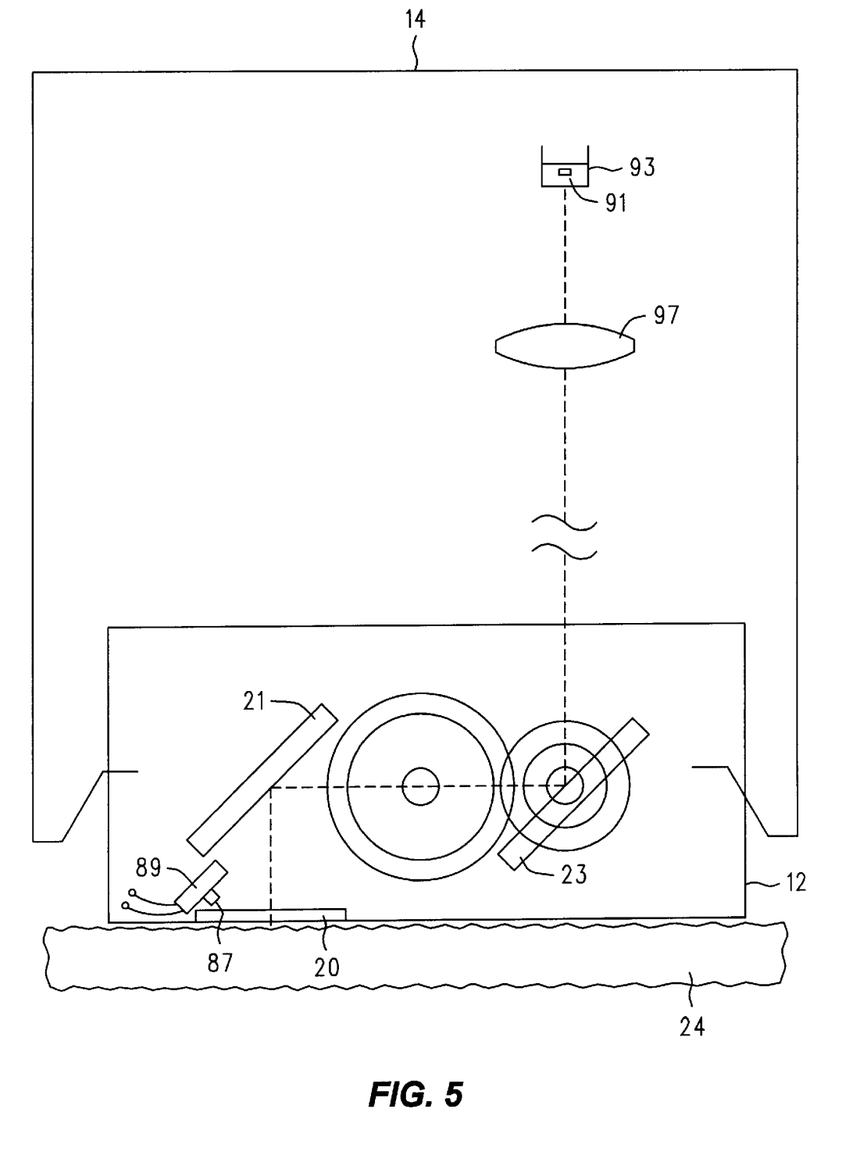
FIG. 5 is a side view in elevation of the hand-held scanner showing the internal optical components of the hand-held scanner, including a rotating mirror according to the present invention.

The rotating image head 12 may be a "contact" type of image head wherein the face 32 of image head 12 is designed to remain in contact with the object 24 while sweeping the scanner over the object 24. That is, the face 32 of image head 12 should remain in full contact with the object 24 (i.e., not tilted with respect thereto) to ensure optimum focus and peak imaging performance. Referring now to FIG. 5, the rotating image head 12 may include a light source assembly 86 for directing light through a window 20 to illuminate the scan line. By way of example, the light source assembly 86 may comprise an array of light emitting diodes (LEDs) 87 mounted to a printed circuit board 89. Alternatively, other types of light sources may be used, such as incandescent or fluorescent lamps.

Figure 8:
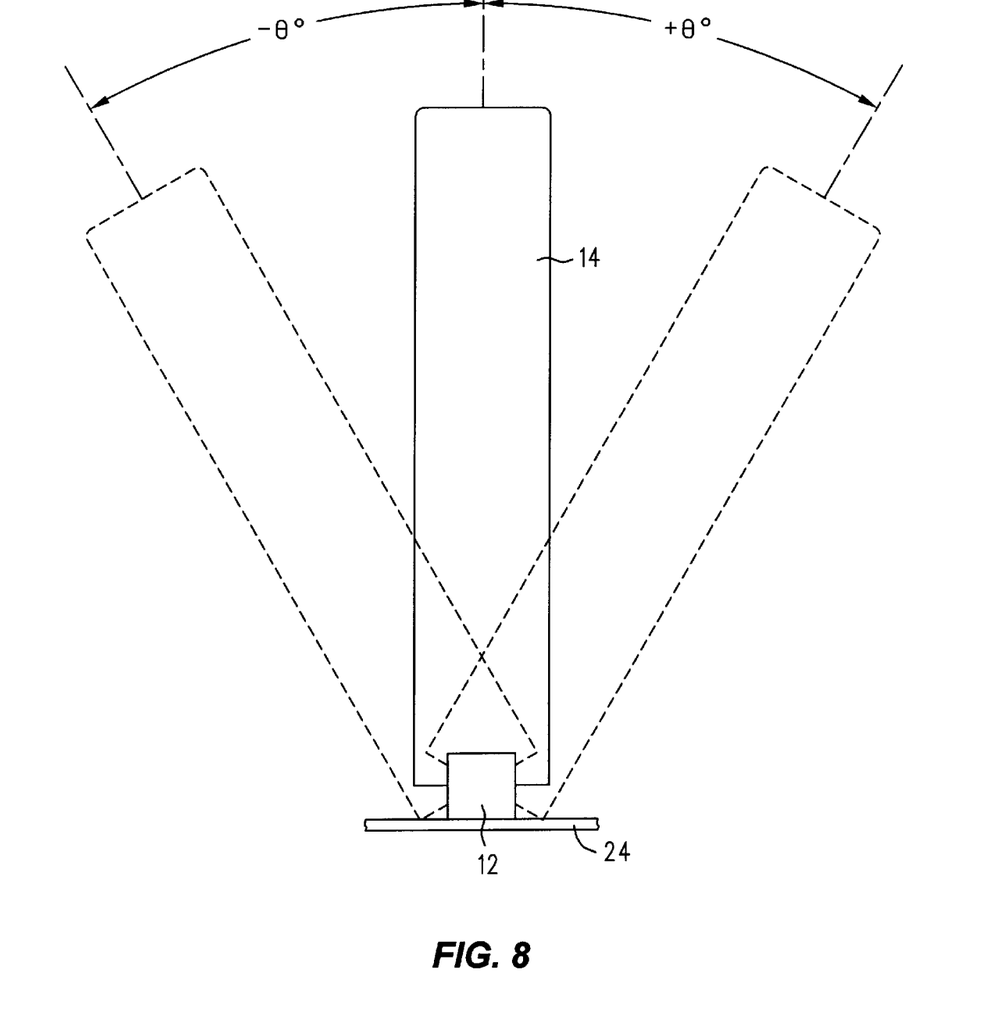
FIG. 8 shows a side view of the hand-held scanner according to the present invention in the neutral position and in the positive and negative displaced positions about the y-axis.

The image head 12 may also include a stationary mirror 21 which receives image light through window 20. Stationary mirror 21 receives image light through window 20 and reflects the image light onto a rotating mirror 23. The rotating mirror 23 rotates at one half of θ, where θ is the angle of rotation of the hand-held scanner body 14 to the rotating image head 12, see FIG. 8. The rotating mirror 23 allows the optical path length to remain constant as the body 14 rotates relative to the image head 12. The rotating mirror 23 also permits the light path incident on the document to remain constant, even though the body 14 of the scanner may rotating relative to the image head 12 and the document 24. In order to maintain a constant optical path, the rotating mirror 23 must rotate at approximately half the rate that the scanner body 14 is rotating relative to the image head 12. It is important that the pivot point of the rotating mirror 23 be at the intersection of the optical axis and the optical surface of the mirror to maintain a constant path length. It is also desirable to have the scanner pivot coincident on the same axis.

The image light reflected from the rotating mirror 23 passes through a lens 97 in the body 14 and is incident on a detector assembly, which may comprise a linear CCD array 91 mounted to a printed circuit board 93 and an optical system 92 for focusing image light from the document onto the CCD array 91. By way of example, the optical system may comprise a lens 97 for focusing image light from the document onto the CCD array 91. Briefly, lens 97 comprises three commonly known optical elements known as a Cooke triplet lens.

Figure 6:
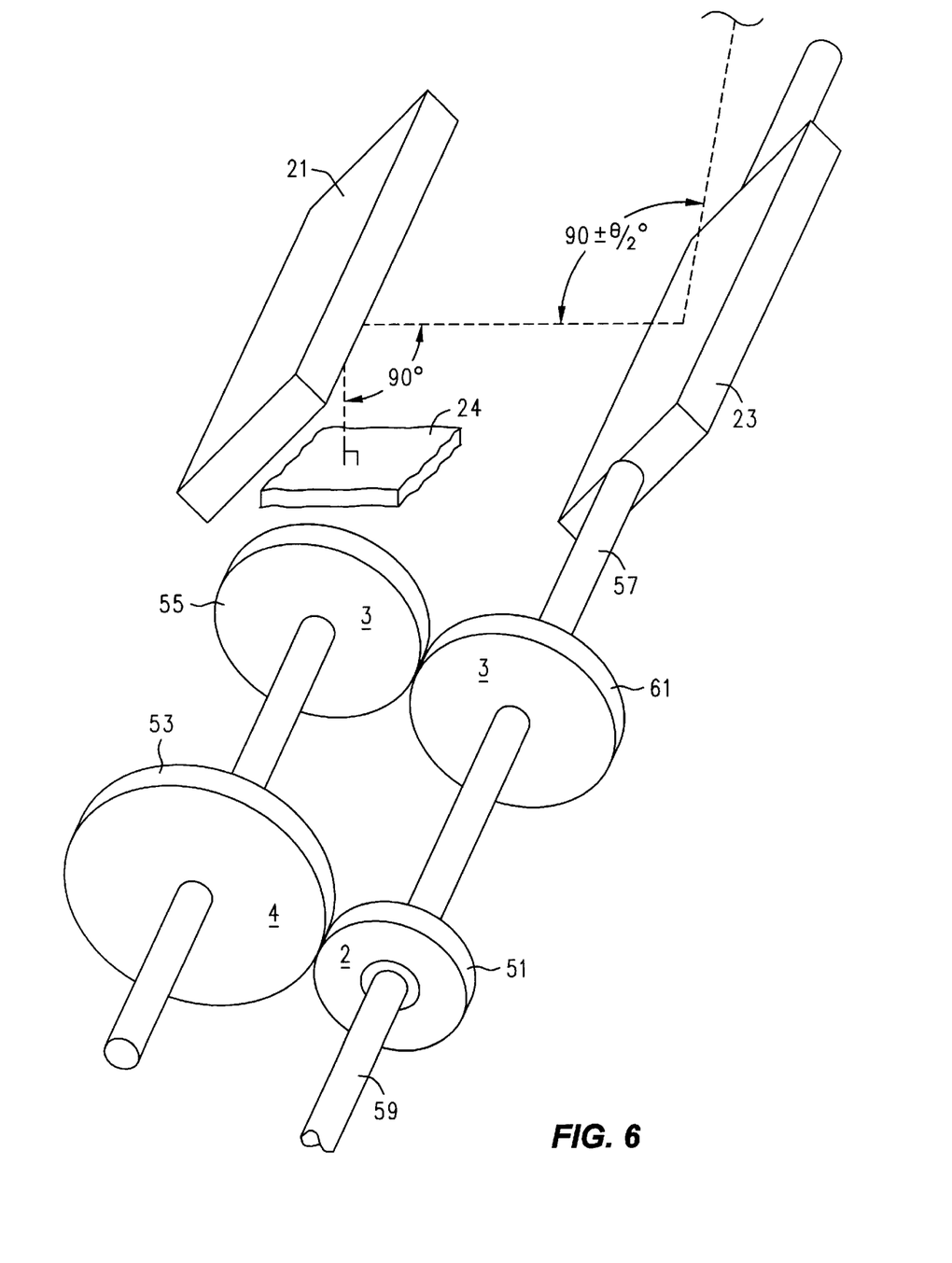
FIG. 6 is a side perspective view of gears used to rotate the rotating mirror in relation to the position of the hand-held scanner body relative to the image head according to the present invention.
Figure 7:
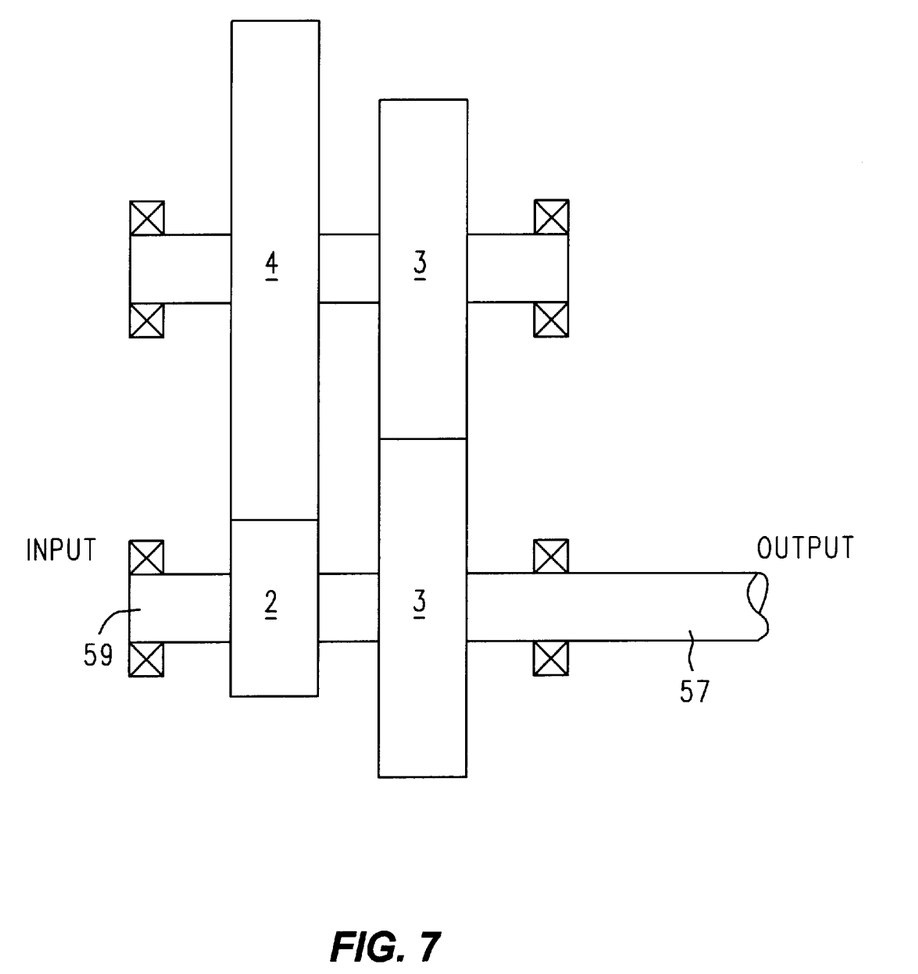
FIG. 7 shows a side perspective view of gears used to translate the position of the hand-held scanner body relative to the image head according to the present invention.

Referring now to FIGS. 5–7, the rotating mirror 23 may be rotated at approximately half of the rotation angle of the body 14 by means of a series of gears to reduce the scanner pivoting input angle e into approximately one half for the mirror pivot. A series of gears 51, 53, 55, and 61 permit the output at the rotating mirror 23 to be approximately half of the rotational input 59 from the body 14.

As seen in FIGS. 6 and 7, gear 51 is half the size of gear 53 and gears 55 and 61 are the same size. This size arrangement of the gears enables the rotating mirror 23 to rotate at half the angle of rotation as the scanner body 14. Gear 51 is connected to the scanner body 14 and rotates freely about shaft 59. Gear 51 is connected to gear 53 and translates the rotation of the scanner body 14 to gear 53. Gear 53 translates the rotation to gear 55 and then on to gear 61. Gear 61 translates the rotation to mirror 23 via shaft 57. Other known means for translating half the angle of rotation of the scanner body 14 to the rotation mirror 23 may also be utilized, such as by means of a small motor. It should also be noted that the rotational axis of the rotating mirror 23 should be coincident with the rotational axis of the scanner body 14 so that the optical path length and the optical orientation may remain constant.

The various components of the image head 12 and the scanner body 14 may be electrically connected to the scanner circuitry (not shown) contained within the body 14 by any convenient means, such as by a flexible printed wiring board, ribbon cable, etc.

The limits of motion about the y-axis may be selected so as to provide the image head 12 with the desired degree of rotation. For example, in one preferred embodiment, the image head 12 is free to rotate about the y-axis by about 15° in either direction. Of course, the rotation and translation limits may be greater or lesser than the foregoing limits, depending on the particular design of the scanner 10. Preferably the degree of rotation about the y-axis is limited to 15–45° in either direction.

Figure 1:
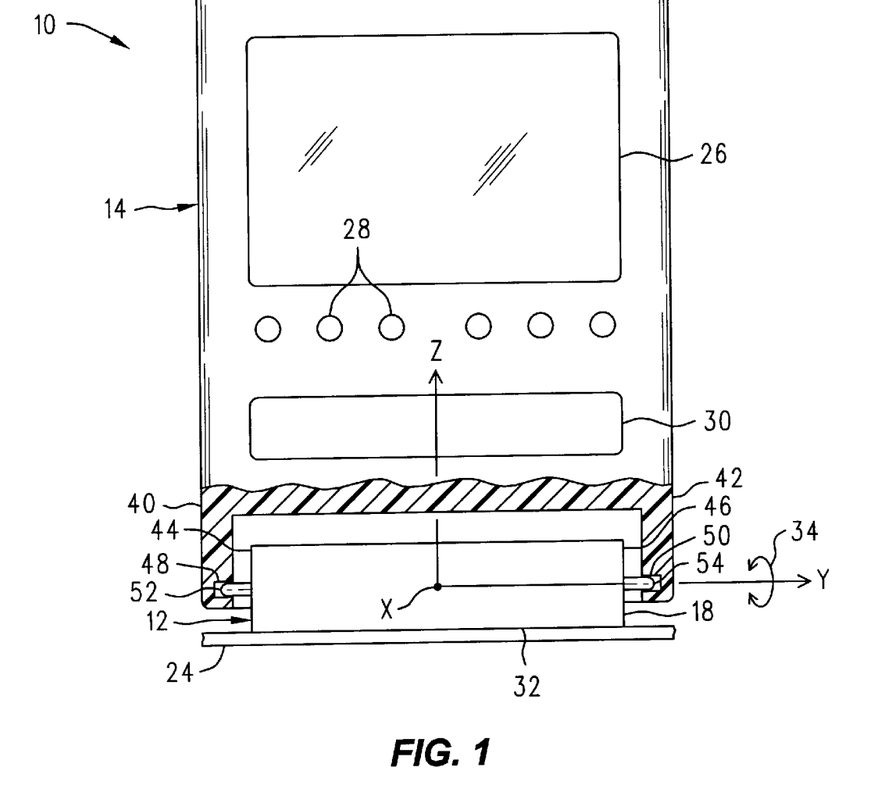
FIG. 1 is a front view in elevation of a first embodiment of a hand-held scanner according to the present invention with a portion of the scanner body broken away to show the rotating image head.
Figure 2:
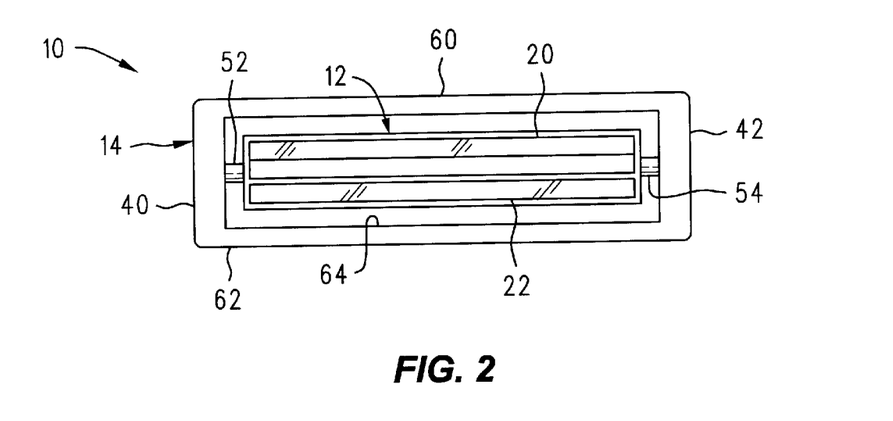
FIG. 2 is a bottom view of the hand-held scanner showing the face of the image head and the light source and detector windows.
Figure 3:
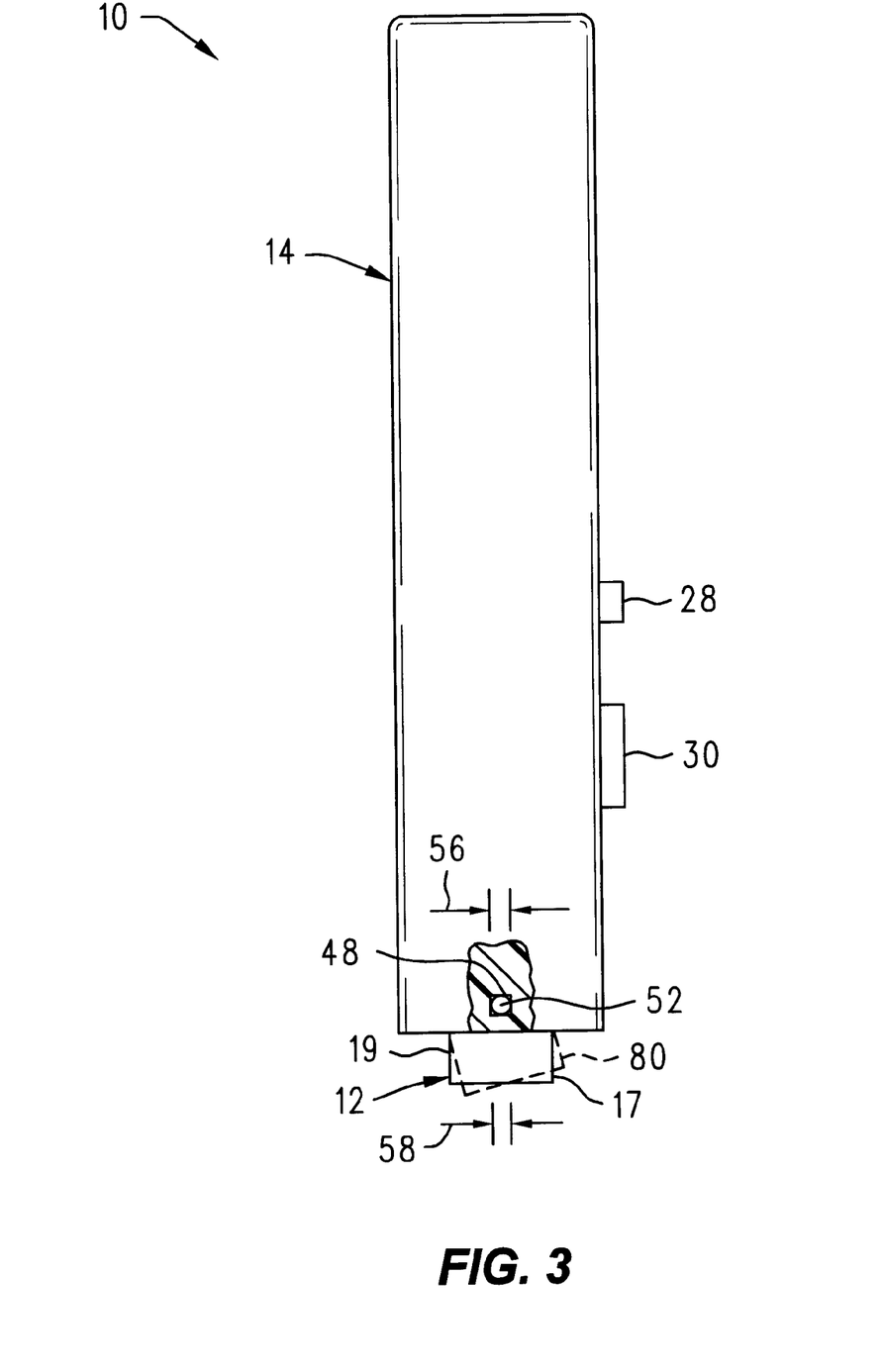
FIG. 3 is a side view in elevation of the hand-held scanner shown in FIG. 1 showing the image head in the neutral position and showing the image head in a displaced position about the y-axis.

An example of a mounting arrangement that provides for such rotational movement of the image head 12 with respect to the body 14 is best seen in FIGS. 1–3. Essentially, the body 14 may be provided with a first end support member 40 and a second end support member 42. The end support members 40 and 42 are adapted to receive the respective ends 44, 46 of image head 12. More specifically, each end support member 40, 42, includes a respective slot 48, 50 sized to receive corresponding pins 52, 54 on the ends 44, 46 of the image head 12. See also FIGS. 1–3. The widths of the slots 48, 50 are substantially equal to the diameters of the pins 52, 54, to allow the image head 12 to rotate freely about the y-axis, as indicated by arrows 34, but not to rotate about the z-axis or the x-axis. For example, the width 56 of slot 48 is about equal to the diameter 58 of pin 52, as best seen in FIGS. 1–3. In one preferred embodiment, the body 14 also includes a pair of skirts 60, 62 that connect the end support members 40, 42, thereby defining a well 64 that receives the image head 12.

The body 14 may be made from any of a wide variety of materials, such as metals, plastics, or composite materials, suitable for its intended use. Therefore, the present invention should not be regarded as limited to any particular material comprising the body 14. By way of example, the body 14 in one preferred embodiment comprises injection molded plastic, e.g., polycarbonate material reinforced with about 20% by weight glass fibers. Similarly, the image head 12 may be made from any material suitable for its intended use, such as metals, plastics, or composite materials. In one preferred embodiment, the image head 12 is made from injection molded polycarbonate plastic reinforced with about 20% by weight glass fibers.

Figure 4:
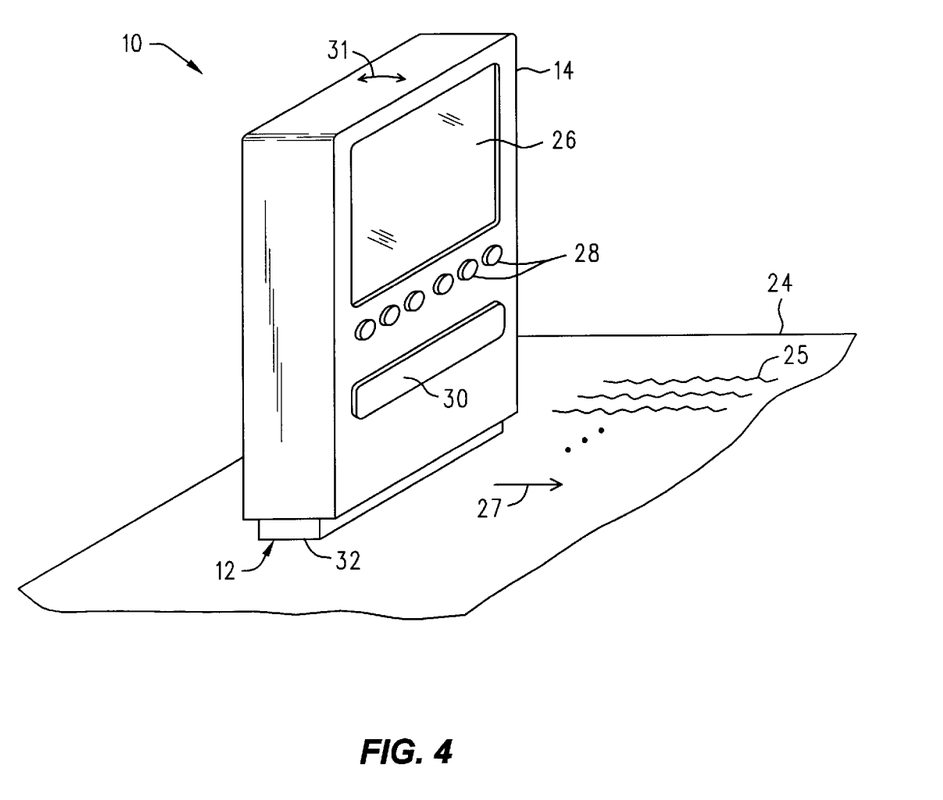
FIG. 4 is a perspective view of the hand-held scanner apparatus positioned over a document to be scanned.

Referring now to FIG. 4, a user (not shown) may operate the hand-held scanner apparatus 10 as follows to capture an image of the object 24, e.g., a piece of paper with printed text 25 thereon. As a first step, the user may first position the scanner apparatus 10 so that the face 32 of the image head 12 is positioned flat against the surface of the paper 24. After making the appropriate selections with the function buttons 28, the user may then initiate the scanning process by pressing the start/stop bar 30 and sweeping the scanner 10 across the page in the scan direction, as indicated by arrow 27. The rotation of the rotating image head 12 permits the face 32 of the image head to remain firmly in contact with the object 24 even though the user may rock or tilt the body 14 to some degree during the sweep operation, as indicated by arrows 29 and 31.

It is contemplated that the inventive concepts herein described may be variously otherwise embodied and it is intended that the appended claims be construed to include alternative embodiments of the invention except insofar as limited by the prior art.

What is claimed is:

1. Hand-held scanner apparatus, comprising:
    a scanner body, said scanner body containing optical components;
    an image head mounted for rotational movement in relation to said scanner body, said image head including a face for receiving image light from an object being scanned;

a rotating mirror for directing said image light to said optical components in said scanner body; and a means for rotating said rotating mirror in relation to the rotational movement of said image head with respect to said scanner body, wherein rotation of said mirror maintains a constant optical path length of said image light.

2. The hand-held scanner apparatus according to claim 1, wherein said rotating mirror is rotated at approximately half of the angle that the image head is rotating in relation to the scanner body.

3. The hand-held scanner apparatus according to claim 1, wherein said rotating mirror is rotated by means of a gear reduction system.

4. The hand-held scanner apparatus according to claim 1, wherein said rotating mirror is rotated by means of a series of gears relative to the rotation of the image head in relation to the position of the scanner body.

5. The hand-held scanner apparatus according to claim 4, wherein the rotational axis of said rotating mirror is coincident with the rotational axis of said scanner body.

6. The hand-held scanner apparatus according to claim 1, wherein said image head is rotatable about a y-axis.

7. The hand-held scanner apparatus according to claim 1, wherein said optical components in said scanner body comprise a lens reduction optical system.

8. A hand-held scanner apparatus, comprising:

a scanner body having a first end support member and a second end support member, said scanner body having optical components contained therein;

an image head having a first end and a second end and having a face for contacting an object being scanned, the first and second ends of said image head being received by the respective first and second end support members in said scanner body such that said image head is retained by said scanner body and capable of rotational movement with respect to said scanner body;

a mirror mounted in said image head for rotational movement in relation to the rotational movement of said image head, wherein a constant optical path length is maintained between said object and said optical components in said scanner body.

9. A method for scanning an object, comprising:

providing a hand-held scanner apparatus, comprising:
   a scanner body, said scanner body having optical components;
   an image head mounted for rotational movement in relation to said scanner body, said image head including a face for receiving image light from said object; and
   a rotating mirror mounted in said image head, said rotating mirror rotating in relation to the angle of said image head;

positioning said hand-held scanner apparatus on said object to be scanned so that the face of said image head remains substantially in contact with said object during said sweeping step; and said rotating mirror rotating in relation to the rotational angle of the image head such that said rotating mirror maintains a constant optical path length between said object and said optical components in said scanner body.

* * * * *